R. J. WALLACE & G. CRAMER.
PHOTOGRAPHIC COLOR FILTER.
APPLICATION FILED NOV. 11, 1909.
961,424.
Patented June 14, 1910.
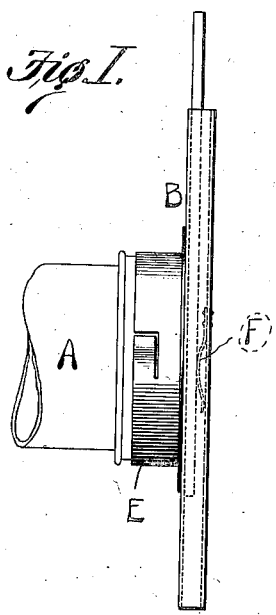
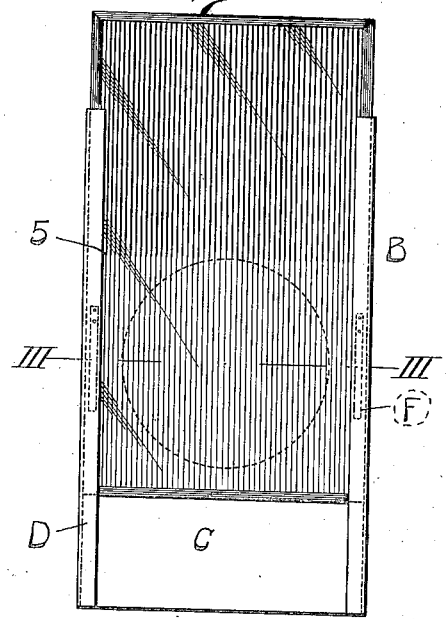
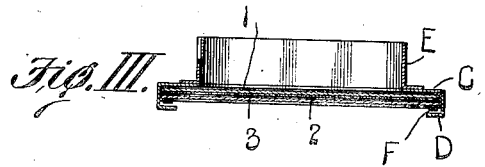
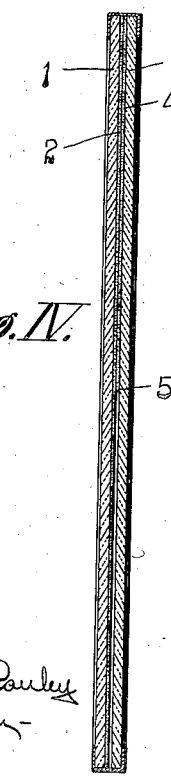
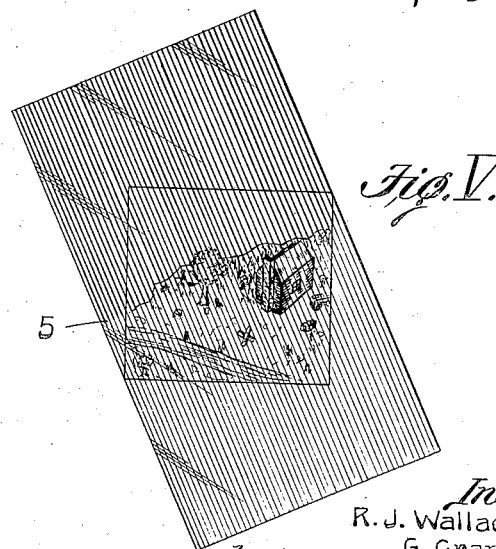
Attest:
A. J. McCauley
E. B. ___
Inventors
R. J. Wallace and
G. Cramer
by ___ atty.

UNITED STATES PATENT OFFICE.

ROBERT JAMES WALLACE AND GUSTAV CRAMER, OF ST. LOUIS, MISSOURI.

PHOTOGRAPHIC COLOR-FILTER.

961,424.  Specification of Letters Patent.  Patented June 14, 1910.

Application filed November 11, 1909. Serial No. 527,368.

*To all whom it may concern:*

Be it known that we, ROBERT JAMES WALLACE, a subject of the King of Great Britain, residing at the city of St. Louis and State of Missouri, and GUSTAV CRAMER, a citizen of the United States of America, residing also at St. Louis, Missouri, have invented certain new and useful Improvements in Photographic Color-Filters, of which the following is a full, clear, and exact description, reference being had to the accompanying drawings, forming part of this specification.

It is well known that in the photographing of landscapes from nature, the sky, owing to its excessive relative brightness (or luminosity) over that of the landscape and general foreground objects, is always represented by too great a density on the photographic negative. This excessive density in the sky portion of the plate results in an abnormal contrast in the resultant print or positive from the same, so that the picture is altogether false and untrue with respect to the original view. This error is accentuated apparently when there are cloud forms showing in the sky as they are entirely lost in the reproduction.

Our invention is designed to perform two specific objects, which, to be rendered clear, demand a consideration of photographic and optical facts.

It is well known that white light is composed of three primary hues, respectively, red, green and blue-violet, the yellow of the solar spectrum being simply caused by the overlap of the red and green, while the blue is formed by the admixture of the green and blue-violet. The brightest hue to the eye is green, while the red comes next in order and then the blue-violet which is very dark. Besides these colors to which the eye is sensitive, there is another region called the ultra-violet which is utterly invisible.

The ordinary photographic plate may be very truly said to be "color blind", and does not represent colors with their relative brightness as the eye sees them, but instead almost completely reverses the order of brightness. First: The blue-violet region is represented as being very bright while the invisible ultra-violet is depicted as almost equally bright. The green and red are inactive, that is to say, the plate is not sensitive to those hues, hence they are represented as practically black. Color in nature or art is simply the result of the absorption of some one or more of the primary hues and is visible to the eye either by reflection, for illustration, green trees and grass, or by transmission, for illustration, solutions and stained glass. The ordinary photographic plate or film, therefore, being sensitive only to the blue-violet and ultra-violet, and insensitive to the other colors, gives, therefore, a record of the view or object which is entirely false except for form, and in many instances even the form is falsified on account of selective color. To overcome this serious defect, various manufacturers have prepared color sensitive plates and films which are known commercially as "iso-" or "orthochromatic," "panchromatic," etc. These plates are not only sensitive to the ultra-violet and blue-violet, but are also sensitive to green and red, respectively. Although these plates have been rendered sensitive to the green and red, yet it is unfortunately true that their maximum sensitiveness still remains in the blue-violet and ultra-violet, the latter two regions actually showing on measurement a difference of 30 to 40 times greater sensitiveness in this region. To reduce this sensitiveness, use is commonly made of a color screen whose function is the dimming down of the excessive chemical energy of the blue-violet and the complete absorption of the ultra-violet. Many color filters have been advocated and generally adopted for this purpose, and although their use has resulted in the improvement of general photographic copies, yet there is still a very considerable error to overcome.

It is known that a photographic plate or film is acted upon by the light in proportion to the amount of unaltered silver bromid present at that moment on the plate or film, and that after development we have a reduction product which is proportional in density to the logarithm of the intensity of the incident beam. This, however, is only true for intensities between certain limits, and the law fails when we overstep them. This function of the plate is termed its "latitude" and intensities higher than the predetermined limit result in gradually lessening deposits of reduction product until a point is reached where reversal occurs. The latitude of different makes of plates and films varies, some having an extended scale and others but a short scale; ordinarily slow plates and films have a short scale; while high speed plates and films have an extended scale. All photographic papers upon which positive prints are made possess a relatively short scale. It will therefore be seen that in a landscape view embracing foreground and sky, there is an extremely extended scale of wide limits, extending from the deepest foreground shadows to the excessively high cloud lights, and utilizing the full compass of any plate or film. The plate or film in turn is beyond the compass of the paper on which it is printed, so that it is advisable to reduce the range of plate or film tones, otherwise, the sky with its variegated cloud forms cannot be printed without the landscape becoming too dark. On the contrary, if the negative be printed from so that the landscape is correctly represented in its relative brightness, then the sky is represented as a blank and inartistic white region, absolutely devoid of cloud form.

In the accompanying drawings:—Figure I is a side elevation of our color filter shown applied to the lens hood of a photographic camera. Fig. II is a front elevation of the parts shown in Fig. I. Fig. III is a cross section taken on the line III—III, Fig. II. Fig. IV is a longitudinal section through the ray filter. Fig. V is a diagrammatical view illustrative of adaptability of our ray filter when making a photograph of a landscape.

In the drawings:—A designates the lens hood such as is used upon ordinary photographic cameras, and B is a holder for our ray filter that is adapted to be attached to and supported by said lens hood. The holder B preferably comprises a plate C having side flanges D and a socket member E fitted to the lens hood and held thereto in any suitable manner. The filter holder is provided with an aperture at the location of the socket member E, in order that the rays of light may pass through the holder to the lens of the lens hood, after passing through the ray filter, which is supported in front of the holder plate C and within the flanges D, the means for such support being preferably spring tongues F that are secured to the flanges D and exert pressure against the ray filter.

1 and 3 designate the plates of glass entering into the construction of our ray filter, both of these plates being in that nature of what is commonly known as "optical plane glass." The plate 1 is coated evenly over its entire surface on one side with dyed gelatin and this coating, (indicated at 2, Fig. IV), is dried with proper precaution to avoid the settling of dust upon the coating. The dye stuff incorporated in the gelatin used for coating the plate 1 is of such nature that it is capable of absorbing evenly throughout the extent of the plate a definite amount of the more actinic rays of the spectrum, with the object in view of reducing their photographic action. The dye used is preferably a combination of tetrazin and esculin combined in proper proportions to duplicate the curve of visual luminosity when used with the proper type of photographic plate, or film, although any other suitable dye stuff may be made use of, provided that the dye stuff possesses an absorption in the region of shorter wave lengths than five thousand depending upon the type of photographic plate or film used.

The holder B of our filter, which corresponds in size to the size of the plate 1, has applied to it a coating 4 which, when first applied to the plate, is plain undyed gelatin. After this undyed gelatin coating has been applied to the plate 3, said plate is laid aside as a proper precaution to prevent accumulation of foreign matter upon its coating, and the coating is permitted to become set. After the coating has become set, the plate is immersed for about one-half ($\frac{1}{2}$) of its length in a dye bath, in order that the portion of the coating entering into the bath may become dyed, after which the plate is removed from the dye bath to permit the immersed portion of the plate and coating thereon to become dried. The dyestuff used in dyeing a portion of the coating on the plate 3 may be in the nature of a neutral gray, or of any other color possessing an absorption corresponding to the active region of the plate, a region that will vary with the sensitiveness of different types of plates and films. The line to which the dyed portion of the coating 4 upon the plate 3 extends from one end of the plate is indicated at 5, Figs. II, IV, and V, and the surface that it covers is denoted in Figs. II and V by the heavier shading in these views.

After two of the plates 1 and 2 have been coated, the former with dyed gelatin extending throughout its surface to afford an absorbing element for the actinic rays of the spectrum, and the plate 3 has been coated and dyed throughout a portion of its length with the object in view of causing its dyed portion to reduce the luminosity of the rays of light passing through it, the two plates are assembled. In placing the plates together, their sides having the coatings 2 and 3 thereon are placed so that they face each other, and the plates are connected by a suitable cement, such for instance as balsam, which may be hardened by a baking operation.

In our invention the light is filtered through an even coating of color 2 on the plate 1, and the color in this coating acts equally upon all of the rays from every point in the view and obtains full color correction according to the color sensitiveness of the plate, while the excessive luminosity of the sky suffers absorption by passing through the deeper even tint in the coating 4 on the upper half of the plate 3.

In the event of the sky line forming an angle by the disposition of foliage, buildings, etc., then the color filter is swung around on the lens hood until the line of division on plate 3 is approximately equal, and the dimming action may be arranged to suit the needs of the view.

The sharp line of demarcation at 5 on plate 3 between the dyed and undyed portions does not show as such as on the photographic plate, because from primary optical principles, this line being within the focus, it is diffused upon the plate.

This color filter may be held in position in front of the camera lens by the holder which fits over the lens hood and which holder will be capable of being moved in circular arc so that the filter may be placed at any angle desired with respect to the plane of the lens surface, thus allowing of the dividing shade line of the filter being oriented with the general position or angle of the sky line, (see Fig. V). The filter is held by suitable means, such as the springs F, at any vertical position to which it may be set, that is either higher or lower with respect to the center of the lens.

A point of real value in our invention is the fact that the ray filter may be slid vertically in its holder so that the upper shaded portion of the filter is free of the lens aperture, thus leaving said aperture covered only by the lower uniformly colored portion of the filter involving the coating 2 on the plate 1, which lower colored portion constitutes a perfectly corrected light filter for use under conditions which do not present abnormally lighted areas, such as woodland views, interiors, and portraits, etc.

It will be understood that our ray filter is for use only where isochromatic or orthochromatic photographic plates or films are used, and the action of this filter upon the light reflected from the view or object is threefold:

A. The reduction of the excessive action in the blue-violet and ultra-violet to which all photographic plates are strongly sensitive, and the consequent forcing of the light action of longer wave lengths, dependent upon the type of plate used, thus giving correct, (or approximately correct), color values depending upon the color sensitiveness of the plate utilized; and B. The dimming down of the excessive luminosity or brightness of the sky or other bright area so that its chemical action upon the plate is reduced and thus rendering the obtention of detail in those bright regions which would otherwise "print white" in positive copies made from the negative, and allowing of remarkably superior results from both a technical and artistic standpoint.

This light filter as described is especially designed for use in landscape photography in combination with color-sensitive plates, although it will be readily apparent that its use is not confined to this class of work, but extends to objects or views embracing unequally luminosity areas, such as interior views, etc.

C. The use of the filter as a color correcting filter on such subjects as do not present sky or other abnormally luminous areas simply by the displacement of said filter vertically along its holder and thus exposing only an equally colored region to the light transmitted by the lens.

We are aware of Patent No. 562,642, granted to McDonough, but our invention is in no way comparable with it, for whereas McDonough makes use of a filter in front of the camera lens, yet the object attained is that of equalizing the relative color intensity throughout the view by means of movable sectors, no selective luminosity correction being attempted or claimed. In our invention, we not only correct the relative luminosity by means of the semi-dyed plate 3, but also at the same time correct the photographic action of the relative color values by means of plate 1. We are also aware of the fact that previous patents have been granted for graduated color filters composed of either an optical or material prism of colored glass or gelatin which being of full density at one end of the filter suffers reduction gradually as it approaches the opposite end. Our invention differs also from these in that the color correcting film is of even optical density, while the luminosity correcting film is also of even optical density, but of lesser area than the former. No graduated color can correct evenly the relative photographic action of color throughout the view—the principle being obviously wrong. The idea also previously patented for the use of alternating strips of different colors as a correcting filter is also erroneous as might be predicated by an average optical knowledge.

We claim:—

1. A ray filter comprising two transparent plates; one of said plates having upon one of its faces a colored coating for the correct photographic rendering of color values by the absorption of the shorter wave lengths of light; and the other plate having upon one of its faces a colored shading coating of less area than the coating upon the first plate; said plates being arranged with their coated faces opposite each other and held in assemblage.

2. A ray filter comprising two transparent plates; one of said plates having upon one of its faces a coating of dyed gelatin for the correct photographic rendering of color values by the absorption of the shorter wave lengths of light; and the other plate having upon one of its faces a colored shading coating of dyed gelatin of less area than the coating upon the first plate; said plates being arranged with their coated faces opposite each other and held in assemblage.

In testimony whereof, we have hereunto affixed our signatures, this 5th day of November, 1909.

R. JAMES WALLACE.
GUSTAV CRAMER.

In the presence of—
E. B. LINN,
A. J. McCAULEY.